(12) United States Patent
Lee et al.

(10) Patent No.: US 8,565,683 B2
(45) Date of Patent: Oct. 22, 2013

(54) ADAPTIVE COLLISION AVOIDANCE APPARATUS AND METHOD IN CHANNEL-HOPPING BASED WIRELESS AD-HOC NETWORKS

(76) Inventors: Anseok Lee, Daejeon (KR); Wun Cheol Jeong, Daejeon (KR); Seong Soon Joo, Daejeon (KR); Jong Suk Chae, Daejeon (KR)

( * ) Notice: Subject to any disclaimer, the term of this patent is extended or adjusted under 35 U.S.C. 154(b) by 343 days.

(21) Appl. No.: 12/952,497

(22) Filed: Nov. 23, 2010

(65) Prior Publication Data

US 2011/0151793 A1    Jun. 23, 2011

(30) Foreign Application Priority Data

Dec. 18, 2009  (KR) .......................... 10-2009-0127486
Apr. 15, 2010  (KR) .......................... 10-2010-0034825

(51) Int. Cl.
*H04B 1/00*     (2006.01)
*H04B 17/00*    (2006.01)
*H04B 7/00*     (2006.01)

(52) U.S. Cl.
USPC ..... 455/63.1; 455/509; 455/226.1; 455/67.13

(58) Field of Classification Search
USPC ................... 455/452.1, 452.2, 512, 513, 453
See application file for complete search history.

(56) References Cited

U.S. PATENT DOCUMENTS

| | | | |
|---|---|---|---|
| 5,956,642 A * | 9/1999 | Larsson et al. | 455/449 |
| 7,155,234 B2 * | 12/2006 | Kitazawa et al. | 455/452.2 |
| 2007/0105574 A1 * | 5/2007 | Gupta et al. | 455/509 |
| 2008/0227475 A1 * | 9/2008 | Suemitsu et al. | 455/513 |
| 2009/0154485 A1 | 6/2009 | Park et al. | |
| 2010/0194985 A1 * | 8/2010 | Unger et al. | 348/570 |

FOREIGN PATENT DOCUMENTS

| | | |
|---|---|---|
| KP | 10-2009-0066121 | 6/2009 |
| KR | 10-2009-0065859 | 6/2009 |

* cited by examiner

*Primary Examiner* — Tilahun B Gesesse
(74) *Attorney, Agent, or Firm* — Staas & Halsey LLP

(57) ABSTRACT

There are provided an adaptive collision avoidance apparatus and a method in a channel-hopping based wireless AD-HOC networks. The adaptive collision avoidance apparatus is configured to include a channel quality measuring unit that measures the quality of each channel by using receiving frames; an unavailable channel classifying unit that classifies unavailable channels not to perform communications in the future based on information on the quality of each channel; an unavailable channel propagating unit that transfers a list of unavailable channels classified as unavailable channels to adjacent nodes; and a transceiver that transmits and receives frames through channels not classified as the unavailable channels.

17 Claims, 8 Drawing Sheets

ADAPTIVE COLLISION AVOIDANCE APPARATUS AND METHOD IN CHANNEL-HOPPING BASED WIRELESS AD-HOC NETWORKS

CROSS-REFERENCE TO RELATED APPLICATIONS

This application claims the priorities of Korean Patent Application Nos. 10-2009-127486 filed on Dec. 18, 2009 and 10-2010-034825 filed on Apr. 15, 2010, in the Korean Intellectual Property Office, the disclosures of which are incorporated herein by reference.

BACKGROUND OF THE INVENTION

1. Field of the Invention

The present invention relates to an adaptive collision avoidance apparatus and a method in channel-hopping based wireless AD-HOC networks, and more particularly, to a technology capable of enabling smooth communications even in the case that the quality of channels is poor and reducing power wastage due to packet loss by preventing the channels having quality lower than a predetermined level from being used when the quality of channels are poor due to frequency selective fading or collision signals from other wireless devices, or the like, in channel-hopping based wireless AD-HOC networks.

2. Description of the Related Art

It is the case that most recently developed wireless communication devices for configuring wireless networks are operated in industrial, scientific and medical (ISM) bands due to the saturation of frequency bands and convenience of development and use. Further, the wireless communication devices used in these bands have become evermore diversified and the number of wireless communication devices used therein has been rapidly increased.

Meanwhile, as the representative related art for configuring low-power wireless networks, there are an IEEE 802.15.4 link and a physical layer technology. Basically, this technology configures the wireless networks using one channel. However, when there are different wireless devices in the use channels, the quality of communications is considerably reduced.

As a robust communication method resistant to the collision in the above-mentioned wireless band, there is a channel-hopping technology using a plurality of channels and performing communications while changing the channels according to the allocated channel hopping sequence. According to the technology, robustness is largely increased as compared to that in IEEE 802.15.4 technology, since communications can be performed in other channels, even in a period of congestion caused due to the existence of the collision devices in one or more channel. However, when attempting communications, even in poor quality channels, most communications fails due to collisions if there is not a separate apparatus managing the quality of channels. Therefore, the quality of communications is degraded and power is unnecessarily consumed. In the worst case, when attempting the communications in the poor quality of channel all the time, the communications link may be lost.

As for the related art to avoid collisions in channel-hopping based networks, there exists a Bluetooth adaptive frequency hopping (AFH) technology, a central concentration technology, and a technology of changing occupied time, and the like.

According to the Bluetooth AFH technology, the degradation in quality of communications is prevented by changing the frequency hopping sequence according to the channel environments. However, since this technology should transfer the hopping sequence to peripheral nodes, it is difficult to apply to general multi-hop networks other than a star network.

Further, according to the central concentration technology, one managing node that manages the networks measures the quality of channels to select the channels that are not used in the network and propagates them to the entire network. In this technology, it is assumed that the nodes configuring the entire networks suffer from the same or similar channel characteristics; however, when the actual scale of the network is large, the technology may not substantially meet this assumption, such that there is a problem in that there are unavailable channels, even when the real quality of channels is good. Further, the delay time to propagate the unavailable channel information to the entire network is long, as well as it is difficult to transfer the information to all the nodes. As a result, it is difficult to apply the central concentration technology to a real network.

The technology of changing the occupied time in each channel according to the quality of channels without changing the hopping sequence is also difficult to apply to a general multi-hop network other than a star network, since all the nodes in the network should share the occupied time for each channel

SUMMARY OF THE INVENTION

An aspect of the present invention provides an adaptive collision avoidance apparatus and a method in channel-hopping based wireless AD-HOC networks capable of enabling smooth communications even in the case that the quality of channels is poor and reducing power wastage due to packet loss by preventing the channels having quality lower than a predetermined level from being used when the quality of channels are poor due to frequency selective fading or collision signals from other wireless devices, or the like, in channel-hopping based wireless AD-HOC networks.

According to an aspect of the present invention, there is provided an adaptive collision avoidance apparatus in channel-hopping based wireless AD-HOC networks, including: a channel quality measuring unit that measures the quality of each channel by using receiving frames; an unavailable channel classifying unit that classifies unavailable channels not to perform communications in the future based on information on the quality of each channel; an unavailable channel propagating unit that transfers a list of unavailable channels classified as unavailable channels to adjacent nodes; and a transceiver that transmits and receives frames through channels not classified as unavailable channels.

According to another aspect of the present invention, there is provided an adaptive collision avoidance method in channel-hopping based wireless AD-HOC networks, including: measuring the quality of each channel by using receiving frames; classifying unavailable channels not to perform communications in the future based on information on the quality of each channel; transferring a list of unavailable channels classified as unavailable channels to adjacent nodes; and transmitting and receiving frames through channels not classified as unavailable channels.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
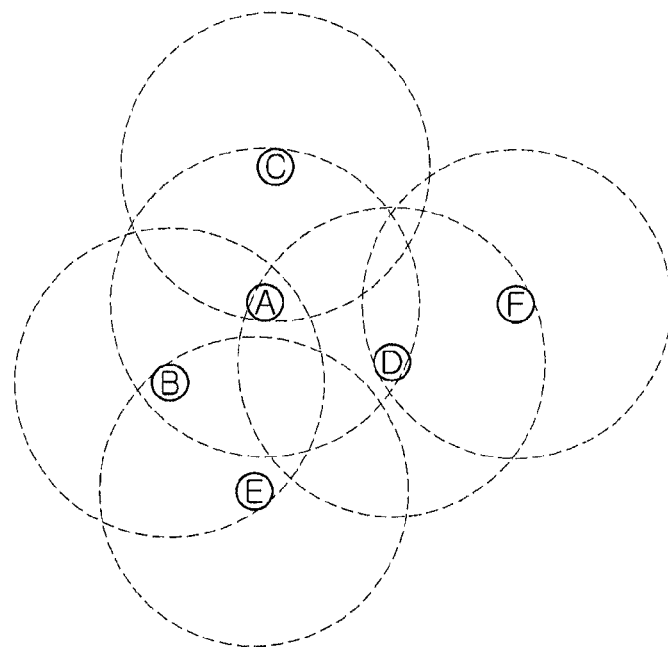
FIG. 1 is a diagram showing an example of channel-hopping based wireless AD-HOC networks to which an adaptive collision avoidance apparatus and a method according to the present invention are applied.

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail. In addition, like reference numerals denote parts performing similar functions and actions throughout the drawings.

Throughout this specification, when it is described that an element is "connected" to another element, the element may be "directly connected" to another element or "indirectly connected" to another element through a third element. In addition, unless explicitly described otherwise, "comprising" any components will be understood to imply the inclusion of other components but not the exclusion of any other components.

FIG. 1 is a diagram showing an example of channel-hopping based wireless AD-HOC networks to which adaptive collision avoidance apparatus and method according to the present invention are applied.

In channel-hopping based wireless AD-HOC networks to which the present invention is applied, the entire time is divided in a time slot unit, data frames are transmitted and received in each slot, and channels performing communications are determined by an allocated channel-hopping sequence and an offset value included in each node.

Figure 2:
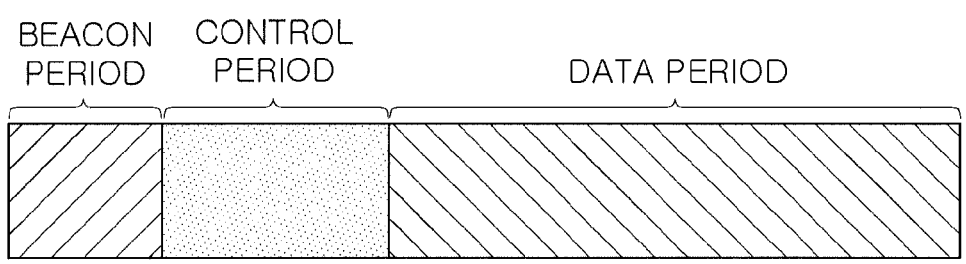
FIG. 2 is a diagram showing an example of superframe architecture for performing the channel-hoping.

FIG. 2 is a diagram showing an example of superframe architecture for performing the channel-hoping.

A superframe for performing the channel-hopping means time architecture shared by each node configuring wireless AD-HOC networks and is configured to include a beacon period, a control period, and a data period.

In the beacon period, each node transmits its beacon frame and receives beacon frames of adjacent nodes to perform time synchronization between the nodes existing in networks.

In the control period, an access is requested and a slot schedule in the data period is allocated.

In the data period, the data frames according to the allocated slot schedule are transmitted and received.

Figure 3:
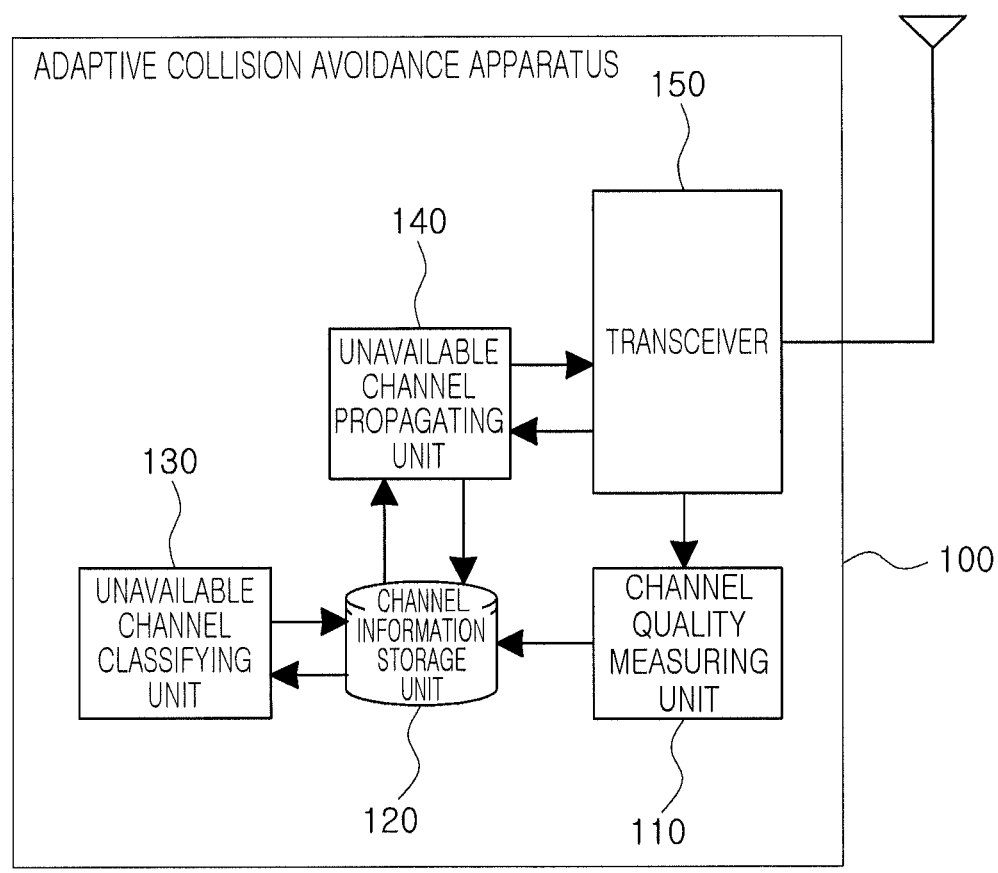
FIG. 3 is a configuration diagram of an adaptive collision avoidance apparatus according to an exemplary embodiment of the present invention.

FIG. 3 is a configuration diagram of an adaptive collision avoidance apparatus according to an exemplary embodiment of the present invention.

An adaptive collision avoidance apparatus 100 according to an exemplary embodiment of the present invention is installed in each node configuring the wireless AD-HOC networks. The adaptive collision avoidance apparatus 100 measures the quality of channels for each channel, classifies unavailable channels, which will not be used later, based on the measured quality of channels, and transmits a list of the unavailable channels to adjacent nodes, such that channels of a quality lower than a predetermined level are not used. To this end, the adaptive collision avoidance apparatus 100 is configured to include a channel quality measuring unit 110, a channel information storage unit 120, an unavailable channel classifying unit 130, an unavailable channel propagating unit 140, and a transceiver 150.

The channel quality measuring unit 110 uses the received frames to measure the quality of channels. To this end, the ratio of the data frame normally transferred to the receiving side among the data frames transmitted through each channel, that is, the transmission success ratio of each channel may be measured.

When receiving the frames, a link quality indicator (LQI) value is additionally provided when a physical layer generally receives the frames. The provided LQI value is an indicator that indicates the quality of channels at a current channel. Therefore, the channel quality measuring unit 110 uses the LQI value provided when receiving the frames to predict the transmission success ratio for each channel.

Further, according to a time division multiple access (TDMA) based communication method, if the frames are not received in the time slot scheduled to receive the frames when a schedule of each time slot is predefined, it can be appreciated that errors may occur. In this case, the transmission success ratio of the corresponding channel may be changed to be low.

In addition, even when transmitting the frames, if the frames are transmitted and an acknowledgement frame is not received, it is considered that the frames have not normally reached the receiving side. As a result, the transmission success ratio of the corresponding channel may be changed to be low.

In addition, when performing a clear channel assessment (CCA) in order to measure a degree of noise in the channel before transmitting the frames, if the CCA fails, the transmission success ratio of the corresponding channel may be changed to be low.

As described above, the channel quality measuring unit 110 predicts the transmission success ratio of corresponding channel by using various measures (e.g. LQI value, receiving acknowledges of previously transmissions, success of clear channel assessment (CCA), etc.) individually or in combination, thereby measuring the quality of channels for each channel.

The channel information storage unit 120 stores the information on the quality of channels measured by the channel quality measuring unit 110. It is preferable that the channel information storage unit 120 stores the expected success ratio obtained by acquiring a moving average of values for the transmission success ratio transferred from the channel quality measuring unit 110. The window size W acquiring the moving average is defined as time. This is to prevent data before the predetermined time from affecting the current quality of channels.

Figure 4:
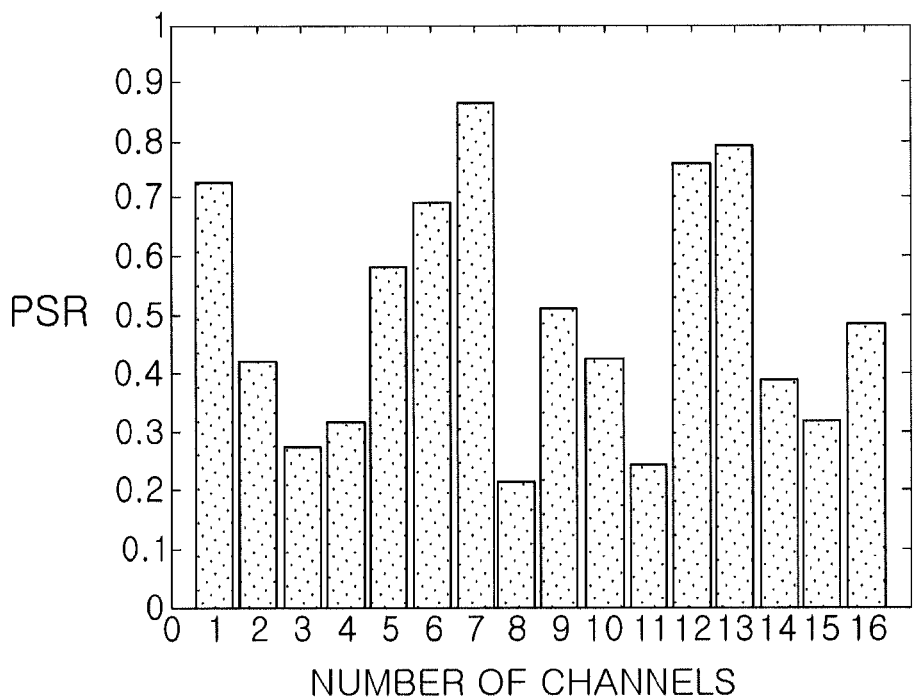
FIG. 4 is a diagram showing an example of information on the quality of channels stored in a channel information storage unit.

FIG. 4 is a diagram showing an example of the information on the quality of channels stored in the channel information storage and shows a packet success ratio (PSR) for each channel.

The unavailable channel classifying unit 130 classifies unavailable channels that are not available to perform the communications in the future, based on the information on the channel quality measured by the channel quality measuring unit 110 or the information on channel quality stored in the channel information storage unit 120.

For convenience of explanation, the number of channels is represented by N and the quality of each channel is represented by CQ(i) ($1 \leq i \leq N$). CQ(i) is information that is measured by the channel quality measuring unit 110 or stored in the channel information storage unit 120. The measurement CQ(i) represents the predicted success rate and has values between 0 and 1.

The unavailable channel classifying unit 130 classifies the corresponding channels as unavailable channels that are not to be used in the future when the value of the CQ(i) is smaller than the predetermined level, for example, $CQ_{th}$.

In this case, $CQ_{th}$ may be a value randomly set by the user. For example, when $CQ_{th}$ is set to 0.1, the unavailable channel classifying unit 130 classifies the channels having the predicted success ratio below 10% as unavailable channels.

Another method may determine $CQ_{th}$ in order to maximize the data transmission amount per the consumed energy. This is to maximize the lifespan of the nodes of the wireless AD-HOC networks when the nodes of the wireless AD-HOC networks using a battery as a power supply transfer the same data amount.

To this end, the need exists for information on the amount of power consumption during the superframe period in order to perform the channel-hopping.

Power E, consumed during one superframe, may be represented by the following Equation 1.

$$E = E_{overhead} + E_{data} \qquad \text{Equation 1}$$

Where $E_{overhead}$ represents power consumed other than power consumed to transmit data, and is changed according to the architecture of the superframe. For example, when the superframe includes the beacon period and the control period as shown in FIG. 2, $E_{overhead}$ may be represented by the following Equation 2.

$$E_{overhead} = E_{bp} + E_{cap} \qquad \text{Equation 2}$$

Where $E_{bp}$ represents power consumed to transmit its own beacon frame or receive the beacon frames from adjacent nodes, that is, the power consumed in the beacon period.

Further, $E_{cap}$ represents power consumed in the control period that transfers control messages for an access request or slot schedule allocation, or the like. Generally, since the contention based channel access is made in the control period, a receiver should be operated, even in the case that control messages are not transmitted and thus, a predetermined amount of power is consumed.

As such, $E_{overhead}$ is a variable including power consumed other than power consumed to transmit data.

Meanwhile, $E_{data}$ represents power consumed to transmit data and is represented by a value in proportion to the number of slots used to transmit data.

In the data period, as an example, when data are transmitted in $n_{tx}$ slots and data are received in $n_{rx}$ slots, $E_{data}$ may be represented by the following Equation 3.

$$E_{data} = n_{tx} \cdot E_{tx} + n_{rx} \cdot E_{rx} \qquad \text{Equation 3}$$

Where $E_{tx}$ represents the amount of power consumed to transmit the data in one slot and $E_{rx}$ represents the amount of power consumed to receive the data in one slot.

The energy $E_{tx}$ used to transmit the data in one slot and the energy $E_{rx}$ used to receive the data are defined as similar values in most transceivers. In this case, the energy used in the transmitting slot and the receiving slot is briefly represented by the following Equation 4.

$$E_{data} \cong n \cdot E_{slot} \qquad \text{Equation 4}$$

Where $$E_{slot} = \frac{(E_{tx} + E_{rx})}{2}$$

and $n = n_{tx} + n_{rx}$.

In other words, the energy used to transmit the data is in proportion to the number of used slots.

In the above-mentioned description, $E_{overhead}$, $E_{tx}$, $E_{rx}$, and $E_{slot}$ may be defined according to the transceiver and the communication protocol standard as well as the method for measuring power consumption.

When the number of data slots used for each channel is SN(i) ($1 \leq i \leq N$), the predicted transmission amount may be represented by the following Equation 5 in consideration of the predicted success rate when unavailable channels are not used.

$$T = \sum_{i=1}^{N} SN(i) \cdot CQ(i) \qquad \text{Equation 5}$$

In this case, the power consumed in one superframe may be represented by the following Equation 6.

$$E = E_{overhead} + \sum_{i=1}^{N} SN(i) \cdot E_{slot} \qquad \text{Equation 6}$$

When the predicted success ratio is smaller than $CQ_{th}$, each of the predicted data transmission amount and power consumption when the corresponding channels are not used may be represented by the following Equations 7 and 8 by using any $CQ_{th}$ in the channel classifying unit 130.

$$T(CQ_{th}) = \sum_{CQ(i) > CQ_{th}, \ 1 \leq n \leq N} SN(i) \cdot CQ(i) \qquad \text{Equation 7}$$

-continued $$E(CQ_{th}) = E_{overhead} + \sum_{CQ(i) > CQ_{th},\ 1 \leq n \leq N} SN(i) \cdot E_{slot} \quad \text{Equation 8}$$

In this case, $CQ_{th}^*$, in order to maximize the transmission amount using the unit energy, may be obtained by the following Equation 9.

$$CQ_{th}^* = \underset{0 \leq x \leq 1}{\arg\max} \frac{T(x)}{E(x)} \quad \text{Equation 9}$$

Each node determines its own $CQ_{th}^*$ by the above-mentioned process and when the predicted success ratio is smaller than $CQ_{th}^*$, the corresponding channels are classified as unavailable channels not to be used, thereby making it possible to maximize data transmission amount per consumed energy.

The detailed example of determining $CQ_{th}^*$ that maximizes data transmission amount per unit energy will be described.

First, it is assumed that the quality of each channel CQ(i) is described in Table 1.

TABLE 1

| Channel Number | CQ (i) |
| --- | --- |
| 1 | 0.725 |
| 2 | 0.417 |
| 3 | 0.273 |
| 4 | 0.314 |
| 5 | 0.581 |
| 6 | 0.689 |
| 7 | 0.863 |
| 8 | 0.211 |
| 9 | 0.507 |
| 10 | 0.425 |
| 11 | 0.240 |
| 12 | 0.756 |
| 13 | 0.792 |
| 14 | 0.386 |
| 15 | 0.318 |
| 16 | 0.481 |

Further, it is assumed that the number SN(i) of reserved data slots per channel is 8 for all channels.

In addition, it is assumed that parameters $E_{slot}$ and $E_{overhead}$ related to the energy consumption are the same as those described in Table 2.

TABLE 2

| Parameter | Value |
| --- | --- |
| $E_{slot}$ | 0.6 mJ |
| $E_{overhead}$ | $16 \cdot E_{slot}$ |

Figure 5:
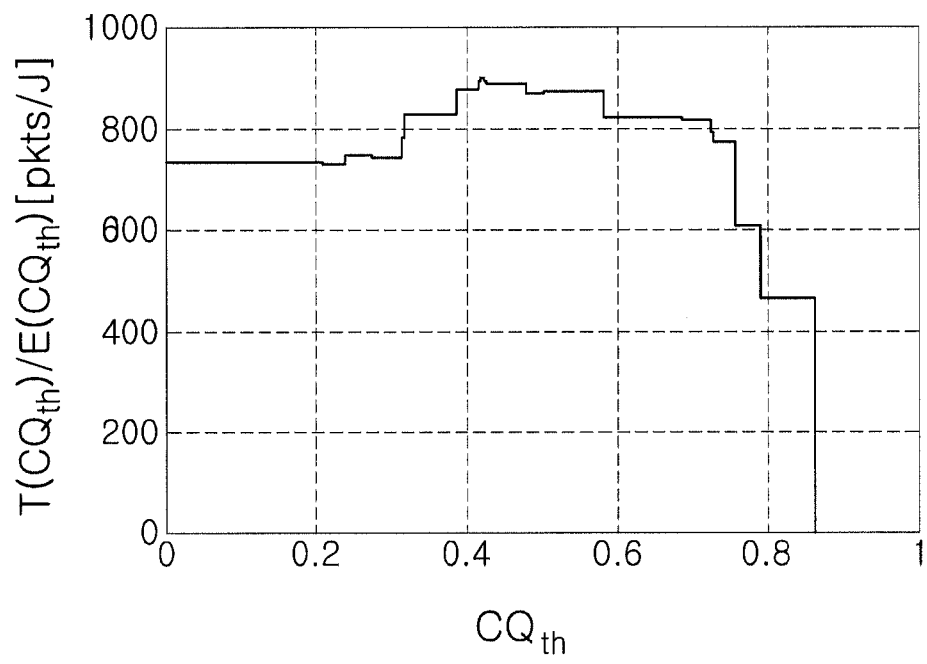
FIG. 5 is a diagram for explaining a determination $CQ_{th}^*$ that maximizes the amount of data transmission per unit energy.

Referring to FIG. 5, it can be appreciated that the $CQ_{th}^*$ maximizing the data transmission amount per the unit energy is between 0.417 and 0.425, as described above.

Figure 6:
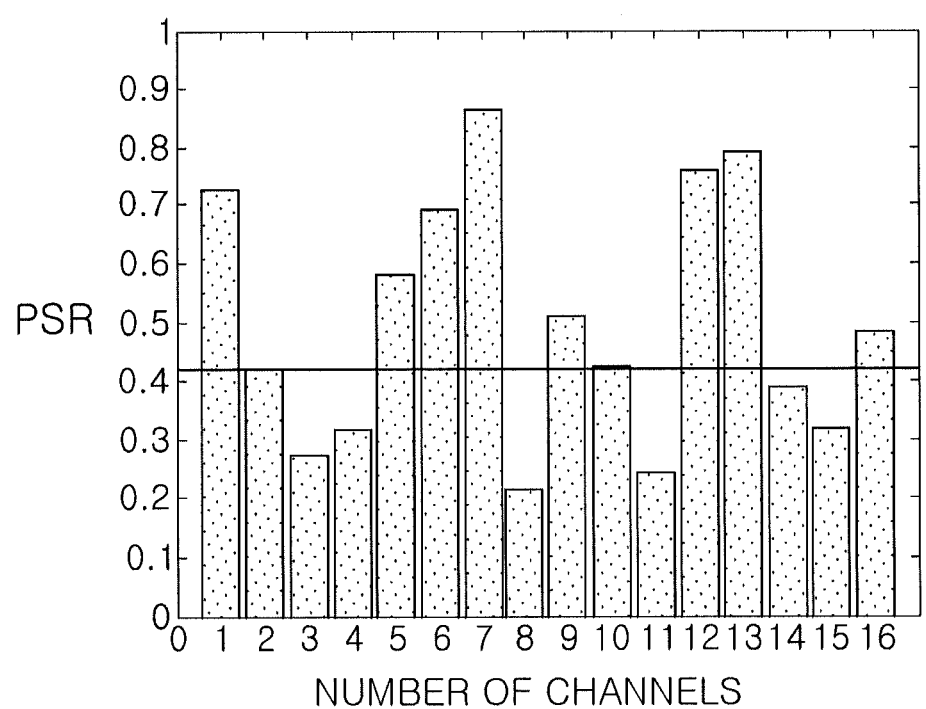
FIG. 6 is a diagram showing a case in which the $CQ_{th}$ of a channel classifying unit is 0.421.

FIG. 6 is a diagram showing a case in which the $CQ_{th}$ of a channel classifying unit is 0.421. In this case, the channels denoted by number {2, 3, 4, 8, 11, 14, 15} are classified as unavailable channels that will remain unused.

Figure 7:
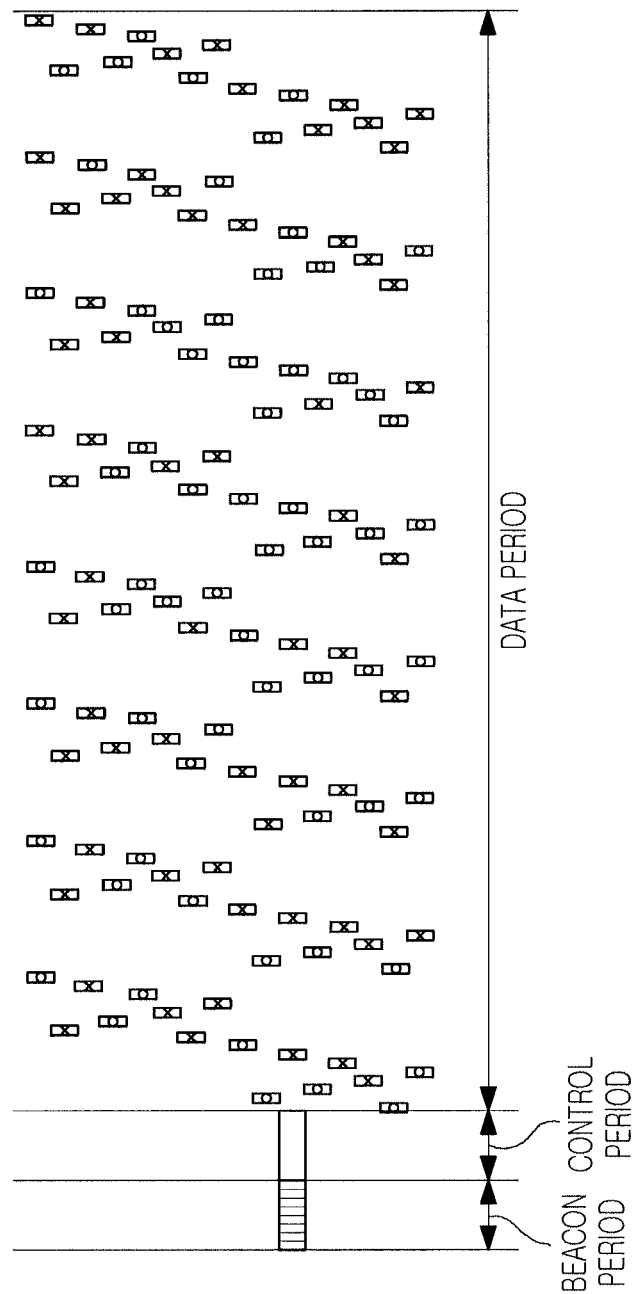
FIG. 7 is a diagram showing a communication state in a case of performing data communications according to an allocated channel-hoping sequence without classifying unavailable channels.
Figure 8:
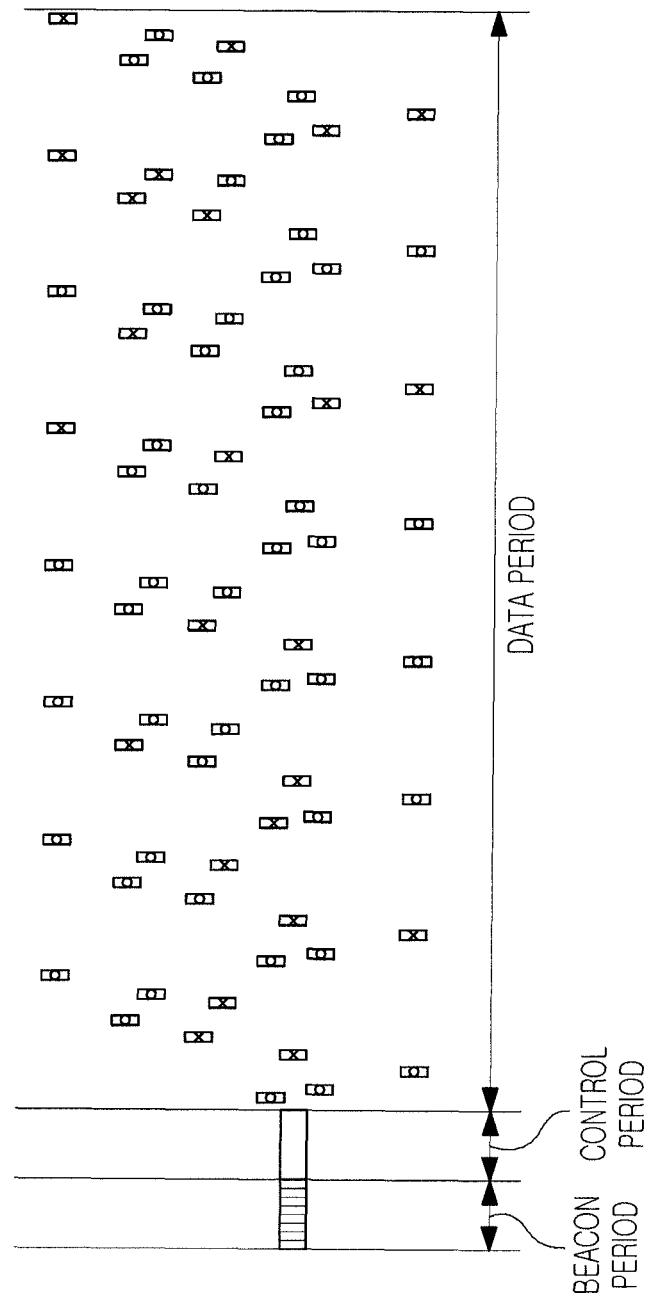
FIG. 8 is a diagram showing the communication state in the case in which the unavailable channels are classified based on the $CQ_{th}$ set as shown in FIG. 6 and the communications are not performed in the unavailable channels.

FIG. 7 is a diagram showing a communication state in a case of performing data communications according to an allocated channel-hoping sequence without classifying unavailable channels and FIG. 8 is a diagram showing the communication state in the case in which the unavailable channels are classified based on the $CQ_{th}$ set as shown in FIG. 6 while communications are not performed in the unavailable channels.

In the two cases, the results of comparing the number of time slots for the transmitting attempt, the number of time slots that succeed in transmission, the energy consumption, and the number of frames transmitted per the unit energy are described in Table 3.

TABLE 3

| Comparison Parameter | Unavailable channels unused | Unavailable channels used |
| --- | --- | --- |
| Number of time slots for transmitting attempt | 128 | 64 |
| Number of time slots successful in transmission | 72 | 48 |
| Energy consumption | 0.087 J | 0.0534 J |
| Number of frames transmitted per unit energy | 735 | 898 |

The unavailable channel propagating unit 140 transfers the list of unavailable channels classified as unavailable channels by the unavailable channel classifying unit 130 to adjacent nodes through the transceiver 150. Further, the unavailable channel propagating unit 140 transfers the list of unavailable channels transferred from adjacent nodes to the channel information storage unit 120. This is to prevent unnecessary data transmission attempts in poor quality channels by exchanging information on unavailable channels classified in each node between the nodes.

The unavailable channel propagating unit 140 makes a bitmap as to whether each channel corresponds to unavailable channel in order to transfer the list of the unavailable channels. For example, when N channels are used, the size of the bitmap is N.

The unavailable channel propagating unit 140 may transfer the unavailable channel list to adjacent nodes by various methods.

Figure 9:
FIG. 9 is a diagram showing the case in which a list of the unavailable channels is added to a beacon frame.

For example, the unavailable channel propagating unit 140 may add and transmit the list of unavailable channels to the beacon frames transmitted by each node as shown in FIG. 9.

Figure 10A:
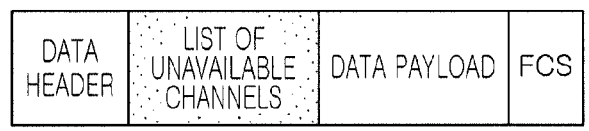
FIGS. 10A and 10B are diagrams showing the case in which the list of unavailable channels is added to a data frame or an acknowledgement frame.
Figure 10B:

Further, the unavailable channel propagating unit 140 adds the list of unavailable channels to the data frame (a) or the acknowledgement frame (b) transmitted by each node and transmits it in a piggybacking type, as shown in FIG. 10.

The transceiver 150 is to transmit and receive the frames. In detail, the transceiver 150 confirms the list of unavailable channels of the receiving node at the time of transmitting the frames such that when the channels to perform the communications are included in the list of the unavailable channels, the corresponding channels do not attempt to perform the transmitting of the frames. Further, the transceiver 150 confirms the list of its own unavailable channels at the time of receiving the frames such that when the channels to perform the communications are included in the list of the unavailable channels, the corresponding channels do not perform the receiving attempt of the frames.

Figure 11:
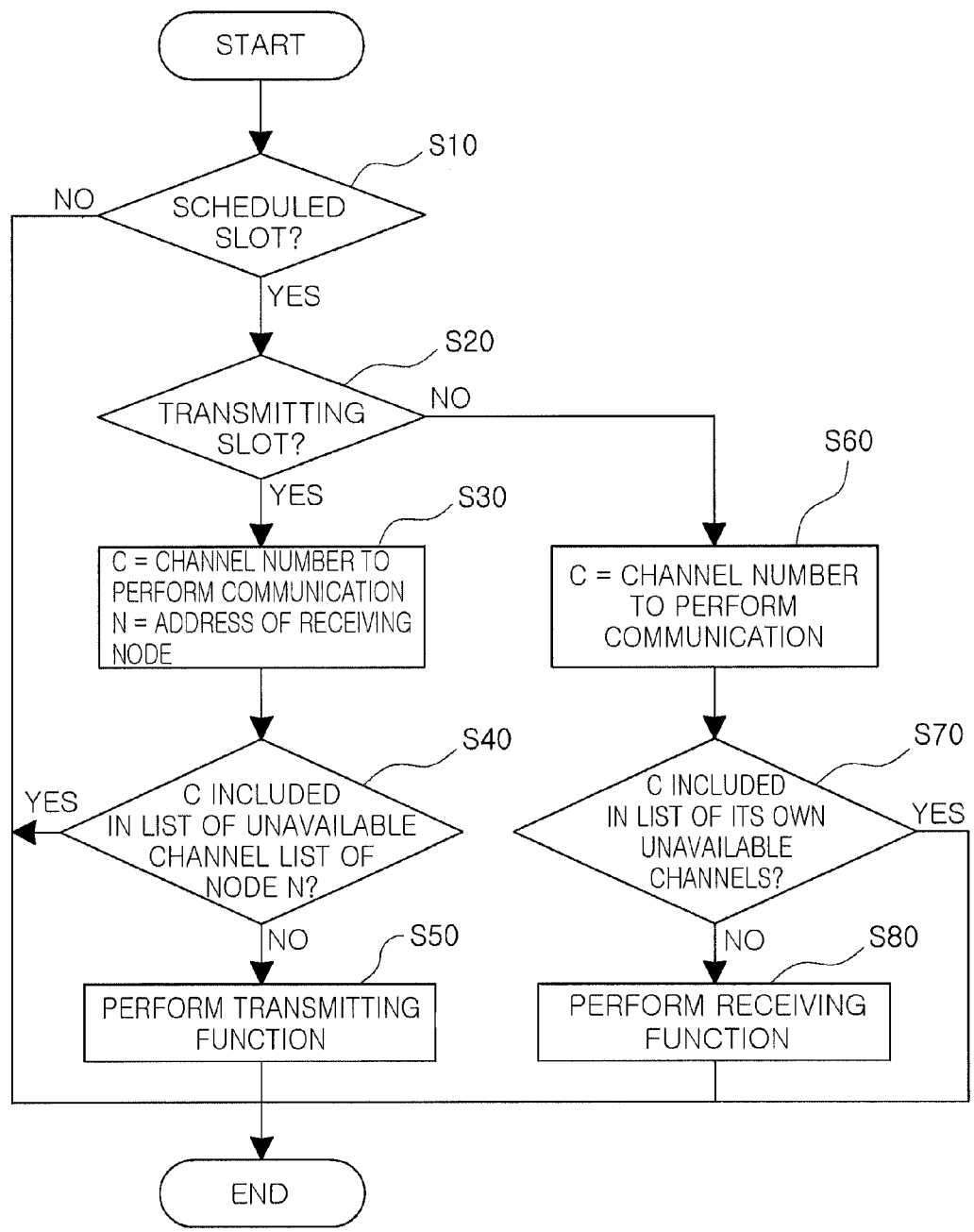
FIG. 11 is a flow chart of a process of transmitting and receiving frames by a transceiver.

FIG. 11 is a flow chart of a process of transmitting and receiving a frame by a transceiver. The transceiver 150 first confirms whether the slots are scheduled (S10) and if so, confirms whether the slots are the transmitting slots (S20).

In the case of the transmitting slots, it confirms the channel numbers to perform the communications and the addresses of the receiving nodes (S30), it confirms whether the channel numbers to perform the communications are included in the list of unavailable channels of the receiving node (S40), and it performs the transmitting function only when the channels to perform the communications are not unavailable channels (S50).

Further, in the case of the receiving slot, it confirms the channel numbers to perform the communications (S60), it confirms whether the channel numbers to perform the communications are included in the list of their own unavailable channels (S70), and it performs the receiving function only when the channels to perform the communications are not unavailable channels (S80).

As set forth above, the present invention measures the quality of channels for each node in the wireless AD-HOC networks using the plurality of channels and classifies the unavailable channels based on the measurement results in order not to use the channels having the quality lower than the predetermined level, thereby making it possible to enable the smooth communications even when the quality of channels is poor and reduce the power consumption due to the loss of packets.

Further, the present invention can operate the wireless communication devices to be adaptive to the quality of channels that can be locally varied in the large-scale networks.

In addition, the present invention does not assume one manager node and operates in a distributed manner. The present invention does not propagate the control information to the entire network but locally exchanges it, such that the overhead occurring during the process of updating the channel information is small and the adaptive time for the variable channels is short.

Moreover, the present invention maximizes the data transmission amount per consumed energy at the time of classifying the unavailable channels, thereby making it possible to increase the lifespan of the networks in the fields such as wireless sensor networks in which energy is an important resource.

While the present invention has been shown and described in connection with the exemplary embodiments, it will be apparent to those skilled in the art that modifications and variations can be made without departing from the spirit and scope of the invention as defined by the appended claims.

What is claimed is:

1. An adaptive collision avoidance apparatus, comprising:
a channel quality measuring unit that measures the quality of each channel by using receiving frames;
an unavailable channel classifying unit that classifies unavailable channels not to perform communications in the future based on information on the quality of each channel;
an unavailable channel propagating unit that transfers a list of unavailable channels classified as unavailable channels to adjacent nodes; and
a transceiver that transmits and receives frames through channels not classified as the unavailable channels,
wherein the transceiver confirms the list of unavailable channels at the time of transmitting and receiving the frames to determine whether the channels to perform communications are unavailable channels.

2. The adaptive collision avoidance apparatus of claim 1, wherein the channel quality measuring unit measures a transmission success ratio for each channel.

3. The adaptive collision avoidance apparatus of claim 2, wherein the channel quality measuring unit predicts the transmission success ratio for each channel by using a link quality indicator (LQI) value provided when receiving the frames in a physical layer.

4. The adaptive collision avoidance apparatus of claim 2, wherein the channel quality measuring unit changes the transmission success ratio of the corresponding channels when it does not receive the frames in scheduled time slots to receive the frames, or does not receive an acknowledgement frame after transmitting the frames, or fails in clear channel assessment (CCA) performed before the frames are transmitted.

5. The adaptive collision avoidance apparatus of claim 1, further comprising a channel information storage unit that stores the information on the measured quality of each channel.

6. The adaptive collision avoidance apparatus of claim 1, wherein the unavailable channel classifying unit classifies channels having the measured quality of channels smaller than a predetermined threshold value as the unavailable channels.

7. The adaptive collision avoidance apparatus of claim 6, wherein the unavailable channel classifying unit sets the threshold value so that data transmission amount per unit energy consumed is maximized.

8. An adaptive collision avoidance apparatus, comprising:
a channel quality measuring unit that measures the quality of each channel by using receiving frames;
an unavailable channel classifying unit that classifies unavailable channels not to perform communications in the future based on information on the quality of each channel;
an unavailable channel propagating unit that transfers a list of unavailable channels classified as unavailable channels to adjacent nodes; and
a transceiver that transmits and receives frames through channels not classified as the unavailable channels,
wherein the unavailable channel propagating unit transfers the list of unavailable channels which is made as a bitmap as to whether each channel corresponds to unavailable channel to adjacent nodes.

9. The adaptive collision avoidance apparatus of claim 8, wherein the unavailable channel propagating unit adds the list of unavailable channels to any one of a beacon frame, a data frame, and an acknowledgement frame and transfers it to the adjacent nodes.

10. An adaptive collision avoidance apparatus, comprising:
a channel quality measuring unit that measures the quality of each channel by using receiving frames;
an unavailable channel classifying unit that classifies unavailable channels not to perform communications in the future based on information on the quality of each channel;
an unavailable channel propagating unit that transfers a list of unavailable channels classified as unavailable channels to adjacent nodes; and
a transceiver that transmits and receives frames through channels not classified as the unavailable channels,
wherein the transceiver confirms the list of unavailable channels of the receiving nodes at the time of transmitting the frames to determine whether the channels to perform communications are unavailable channels and confirms the list of unavailable channels of the node on which the adaptive collision avoidance apparatus is mounted at the time of receiving the frames to determine whether the channels to perform the communications are the unavailable channels.

11. An adaptive collision avoidance method, comprising:
measuring the quality of each channel by using receiving frames;

classifying unavailable channels not to perform communications in the future based on information on the quality of each channel;

transferring a list of unavailable channels classified as unavailable channels to adjacent nodes; and transmitting and receiving frames through channels not classified as the unavailable channels, wherein the transmitting and receiving of the frames confirms the list of unavailable channels to determine whether the channels to perform communications are unavailable channels.

12. The adaptive collision avoidance method of claim 11, further comprising storing information on the measured quality of each channel.

13. The adaptive collision avoidance method of claim 11, wherein the classifying of unavailable channels classifies channels having the measured quality of channels smaller than a predetermined threshold value as the unavailable channels.

14. The adaptive collision avoidance method of claim 13, wherein the threshold value is set to maximize the amount of data transmission per the unit energy consumed.

15. An adaptive collision avoidance method, comprising:

measuring the quality of each channel by using receiving frames;

classifying unavailable channels not to perform communications in the future based on information on the quality of each channel;

transferring a list of unavailable channels classified as unavailable channels to adjacent nodes; and transmitting and receiving frames through channels not classified as the unavailable channels, wherein the transferring of the list of unavailable channels to adjacent nodes transfers the list of unavailable channels which is made as a bitmap as to whether each channel corresponds to unavailable channel to adjacent nodes.

16. The adaptive collision avoidance method of claim 15, wherein the transferring of the list of unavailable channels to the adjacent nodes adds the list of unavailable channels to any one of a beacon frame, a data frame, and an acknowledgement frame and transfers it to the adjacent nodes.

17. An adaptive collision avoidance method, comprising:

measuring the quality of each channel by using receiving frames;

classifying unavailable channels not to perform communications in the future based on information on the quality of each channel;

transferring a list of unavailable channels classified as unavailable channels adjacent nodes; and transmitting and receiving frames through channels not classified as the unavailable channels, wherein the transmitting and receiving of the frames includes:

confirming whether the slots are scheduled;

confirming whether the slots are the transmitting slots or the receiving slots in the case of the scheduled slots;

confirming whether channel numbers to perform the communications are included in the list of unavailable channels of the receiving nodes in the case of the transmitting slots;

confirming whether channel numbers to perform the communications are included in the list of their own unavailable channels in the case of the receiving slots; and performing the transmitting or receiving functions only when the channels to perform the communications are not the unavailable channels.

\* \* \* \* \*